(12) United States Patent
Bordini

(10) Patent No.: US 6,581,706 B2
(45) Date of Patent: Jun. 24, 2003

(54) PROPULSION UNIT FOR A SELF-PROPELLED VEHICLE

(75) Inventor: Giorgio Bordini, Santa Cruz de Tenerife (ES)

(73) Assignee: New Holland North America, Inc., New Holland, PA (US)

(*) Notice: Subject to any disclaimer, the term of this patent is extended or adjusted under 35 U.S.C. 154(b) by 51 days.

(21) Appl. No.: 09/981,368

(22) Filed: Oct. 16, 2001

(65) Prior Publication Data

US 2002/0148659 A1 Oct. 17, 2002

(30) Foreign Application Priority Data

Oct. 18, 2000 (IT) ....................... BO2000A0607

(51) Int. Cl.⁷ .............................................. B60K 1/00
(52) U.S. Cl. ........................ 180/65.2; 180/65.6; 475/5
(58) Field of Search ....................... 475/5; 180/65.2, 180/65.3, 65.4, 65.6, 65.7

(56) References Cited

U.S. PATENT DOCUMENTS

| | | | | |
|---|---|---|---|---|
| 3,861,485 A | * | 1/1975 | Busch | 180/65.7 |
| 4,354,144 A | * | 10/1982 | McCarthy | 318/13 |
| 4,574,659 A | * | 3/1986 | Arndt | 475/5 |
| 4,854,190 A | * | 8/1989 | Won | 475/5 |
| 5,364,319 A | * | 11/1994 | Boll et al. | 475/224 |
| 5,492,189 A | * | 2/1996 | Kriegler et al. | 180/65.2 |
| 5,679,085 A | * | 10/1997 | Fredriksen et al. | 475/76 |
| 5,775,449 A | * | 7/1998 | Moroto et al. | 180/65.2 |
| 5,993,351 A | * | 11/1999 | Deguchi et al. | 477/5 |
| 6,073,720 A | * | 6/2000 | Vanderlinden | 180/307 |
| 6,157,147 A | * | 12/2000 | Lin | 318/9 |
| 6,190,282 B1 | * | 2/2001 | Deguchi et al. | 477/5 |
| 6,428,443 B1 | * | 8/2002 | Dischler | 475/343 |
| 6,481,516 B1 | * | 11/2002 | Field et al. | 180/65.2 |

FOREIGN PATENT DOCUMENTS

| | | | | |
|---|---|---|---|---|
| DE | 19749074 A1 | * | 5/1999 | B60L/11/02 |
| EP | 1199204 A1 | * | 4/2002 | B60K/6/02 |

* cited by examiner

*Primary Examiner*—Brian L. Johnson
*Assistant Examiner*—Kelly E Campbell
(74) *Attorney, Agent, or Firm*—John Williams Stader; A. Nicholas Trausch; Rebecca L. Henkel

(57) ABSTRACT

A propulsion unit for a tractor includes a diesel engine and two electrical machines. The diesel engine and the two electrical machines are connected mechanically to a device for subdividing and re-combining of the output powers delivered by the diesel engine and delivered or absorbed by the electrical machines. The electrical machines are capable of operating both as generators and as motors. The propulsion unit is operable such that in at least one interval of the ground speed of the tractor, the electrical fraction of the power delivered or absorbed by the electrical machines is zero.

11 Claims, 5 Drawing Sheets

PROPULSION UNIT FOR A SELF-PROPELLED VEHICLE

BACKGROUND OF THE INVENTION

The present invention relates to a propulsion unit for a self-propelled vehicle such as an agricultural tractor.

According to the art, propulsion units are known in which some of the energy produced by an internal combustion engine is transformed into electrical energy, in order to improve the control of the latter. However, these units are characterized on the one hand by low performance levels and on the other hand by a limited speed range at which the arrangement can operate at full power.

Various systems are known in the art which allow the power to vary continuously. For example, for this purpose, hydraulic, electrical and steam systems advantageously can be used. In general, whenever the power is transmitted by "fluid" means, it is possible to regulate this power continuously. Since it is known that any power is transmitted at the expense of loss of the power itself (as a result of efficiency or performance levels which are always lower than a factor one) and moreover that the transition from one sort of power (e.g. mechanical power) to another sort (e.g. electrical power) also always is done at the expense of efficiency, it has been attempted to obtain solutions which, whilst permitting fine and continuous regulation of the power, have the consequence that a portion of the power produced by the internal combustion engine must be transmitted purely mechanically (for safeguarding the highest possible level of efficiency). Thus, it has been necessary to devise a form of interaction between those factors which can be finely and continuously controlled, such as the electrical power, with the portion of power which is always transmitted mechanically. To this end, it has been important to see how handling of a first flow of power, converted into electrical power, affects a second flow of power which, from the moment when it is generated at the internal combustion engine, until it is transmitted to the wheels of the vehicle, always continues to be mechanical.

SUMMARY OF THE INVENTION

It is an object of the present invention to provide a propulsion unit which can achieve the speed of travel of the vehicle selected by the driver in a continuous manner.

It is an advantage of this invention that a propulsion unit that can achieve the selected speed of travel in a continuous manner can be utilized on an agricultural tractor.

It is a feature of this invention that an agricultural tractor can be operable to regulate continuously the power to be transmitted to the wheels of the tractor.

It is another object of this invention that the operator of an agricultural tractor can elect to operate the tractor as an electric motor vehicle.

It is another feature of this invention that the portion of the power which continues to be mechanical, is conditional on the electrical fraction.

It is another advantage of this invention that this conditioning takes place without appreciable losses for low performance or load levels.

It is still another object of this invention to retain a mechanical fraction of the power which is transmitted to the wheels of the tractor with the highest possible efficiency level.

These and other objects, features and advantages are accomplished according to the instant invention by providing a propulsion unit for a vehicle, including a diesel engine and at least two electrical machines connected mechanically to a device for subdivision/re-combination of the powers delivered by the diesel engine and delivered or absorbed by said electrical machines in which the unit is configured so that in at least one interval of the ground speed of the tractor, the electrical fraction of the power delivered or absorbed by the said electrical machines is zero.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

Figure 1:
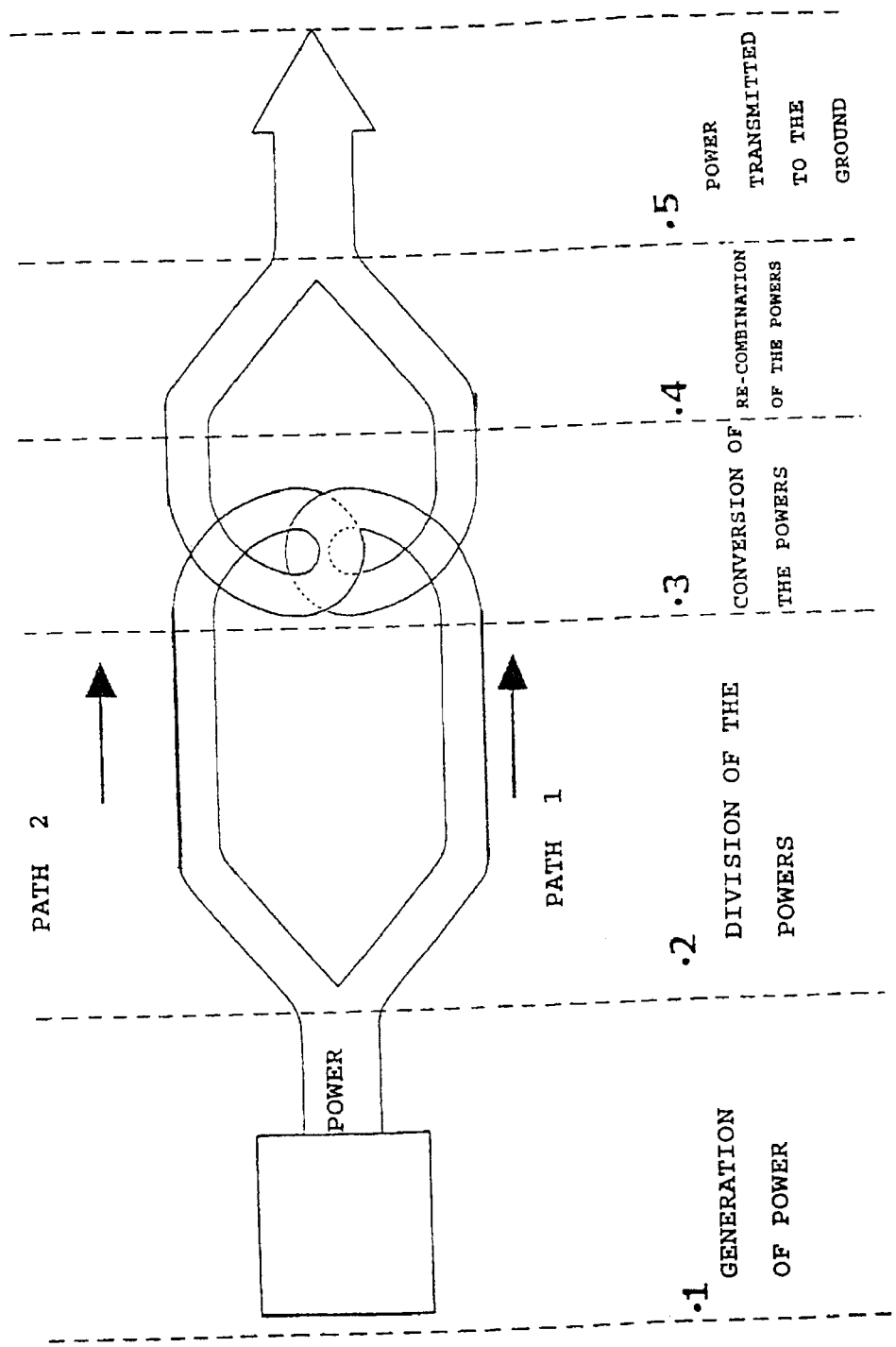
FIG. 1 is a flow chart illustrating the power which exemplifies the concepts on which the propulsion unit incorporating the principles of the present invention, is based.

FIG. 1 exemplifies the concepts on which the present invention is based. In a first station of the power flow path, the power generated by an internal combustion engine, and in particular by a diesel engine, is supplied to the system in optimum conditions of functioning of the internal combustion engine. These optimum conditions are, by definition, those in which there is the minimum emission, combined with minimum noise and minimum consumption.

In the second station, the mechanical power produced in the first station is subdivided into two flows of mechanical power. At the third station, some of the flow of mechanical power is converted into electrical energy, and immediately afterwards is re-converted into mechanical energy, and re-combined, in the fourth station, with the portion of the power which remained mechanical in station 3. At the fifth station, the re-combined mechanical power is transmitted to the ground, in order to move the self-propelled vehicle.

In other words, in the unit which is the subject of the present invention, the flow of power produced by an internal combustion engine is subdivided into two flows. A first flow is converted into electrical power which is easy to control, whereas a second flow is kept mechanical all the time, in order to avoid losing the high level of efficiency caused by the fact that this mechanical power is not converted into electrical power, and then re-converted into mechanical power, which conversions, as is known, are obtained with a double loss of power, owing to the lower efficiency levels of the electric machines. However, and this is one of the most innovative aspects of the present invention, the portion of power which has continued to be mechanical all the time, is dependent on the fraction which has been transformed into electrical power. As already mentioned, this conditioning takes place without appreciable losses when operating at low load levels.

Action is taken on the speed and on the torque which are imparted to the wheels, by intervening only on the electrical fraction of the power, at the same time also regulating the other fraction which has continued to be mechanical.

In addition, in order to be able to have a wide range of regulation, i.e. in order to be able to enable the system to have speeds of up to 50 Km/h, and to have maximum traction when the speeds are minimum, and traction which is limited by the installed power when the speeds are maximum, the system must have an enormous range of regulation. The foregoing is obtained by using the possibilities of regulation on four quadrants of the machines which are part of the unit. It is therefore very important for the propulsion unit to have electric machines which can be used in both directions of the speed of rotation, and in both directions of the torque. These electric machines must therefore be right-handed and left-handed, and must be able to function as motor or as brake, so that they can define cinematic conditions which are such as to cover all the speed ranges, and dynamic conditions which are such as to cover all the torque ranges, by functioning either as motor or as brake.

According to the present invention, if an electric machine functions as a motor, its energy must be obtained from another electric machine belonging to the same unit, and which acts as a generator, or it must be obtained from devices for accumulation of electrical energy, such as batteries, especially in the case of power over-boost. In principle, a battery is not essential for functioning of the system, however it is advantageous in order to provide supplemental electrical energy when a power over-boost takes place. If an electric machine functions as a motor, by using the electrical power produced by the other electric machine which functions as a generator, the resulting energy balance is always zero, even without the batteries, apart from the losses of efficiency which lead to a drop in the final power transmitted to the wheels.

In order to obtain regulation of the speed between zero and the maximum, and simultaneously regulation of the traction, which varies hyperbolically in relation to the speed, it is necessary to have extended regulation, wherein the electric machines can implement a dual direction of rotation of the motor shaft and a dual direction of the torque.

To summarize, FIG. 1 shows the following processing of the mechanical power:
 the power is divided into two flows;
 a first mechanical flow is converted into an electrical flow, and is controlled according to the operating conditions which the unit must obtain;
 a second mechanical flow is conditioned for balance by the first flow; and
 the electrical power is re-converted into mechanical power, and is re-combined with the second mechanical flow.

Figure 2:
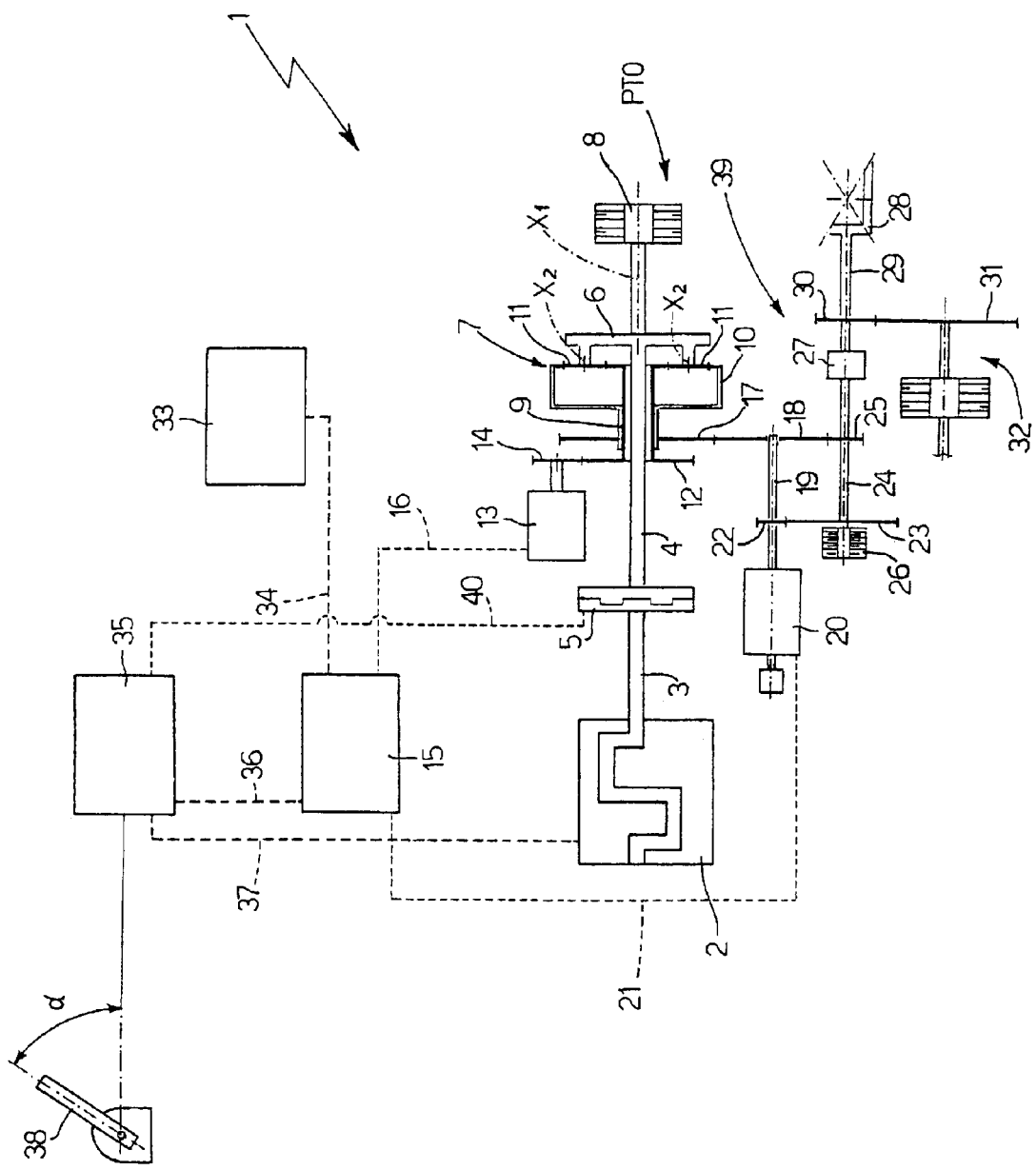
FIG. 2 is a schematic diagram of the propulsion unit incorporating the principles of the present invention.

Referring now to FIG. 2, the propulsion unit 1, incorporating the principles of the instant invention can best be seen. The propulsion unit 1 includes an internal combustion engine 2, and in particular a diesel engine, which can supply mechanical power to a first drive shaft 3, the latter being connected mechanically to a second drive shaft 4, by means of a device 5 for torque limitation and for mechanical connection/disconnection of the shaft 3 to/from the shaft 4.

At the distal end of the device 5, the second shaft 4 ends in a spider or planet-carrier 6 belonging to an epi-cycloid drive system or gearing 7. From the spider onwards, some of the power may be transmitted to a clutch 8 of a PTO (not shown).

In addition to the aforementioned spider 6, the epi-cycloid gearing 7 comprises a solar gear or unit 9, a ring gear 10, and a series of satellite gears 11. In a conventional manner, the spider 6 carrying the satellite gears 11 is rotated by the internal combustion engine 2 around an axis X1, whereas the satellites 11 can rotate around axes X2, in a manner which will be described in greater detail hereinafter.

Integrally with the solar unit 9, there is provided a toothed wheel 12, which is used to transmit the motion to, or receive the motion from, an electric machine 13, by means of a toothed wheel 14, which, for this purpose, is engaged with the toothed wheel 12. According to the operating conditions of the motor unit 1, this electric machine acts either as a generator or as a motor (as described hereinafter). In addition, the electric machine 13 is connected electrically to a power converter 15, by means of an electric line 16.

With reference once more to the gearing 7, it can be noted that integrally with the ring 10, there is provided a toothed wheel 17, which engages with an idle wheel 18 on a shaft 19 of an electric machine 20, which is also connected electrically to the converter 15, by means of an electric line 21. According to the operating conditions of the unit 1, the electric machine 20 can also function either as a generator or as a motor (as described hereinafter). On the shaft 19, a further toothed wheel 22 is keyed engaging with a toothed wheel 23, which in turn is keyed onto a shaft 24. This shaft 24 supports a toothed wheel 25, which is engaged with the said idle wheel 18. In addition, at one of its ends, the shaft 24 has a brake 26, whereas the other end can advantageously, but not necessarily, accommodate a gear change mechanism or transmission 27 with two (or more) ratios, by means of which motion is transmitted to a differential 28, which is associated with the rear wheels of the motor vehicle. Between the gear change 27 and the differential 28, there is a shaft 29 carrying a toothed wheel 30 engaged with a toothed wheel 31, which belongs to a device 32, for transmitting drive to the front axle of the motor vehicle, in case the vehicle would be four-wheel driven. A device 33 for accumulation of electrical energy, such as a battery, is connected electrically to the converter 15, by means of an electric line 34.

All the operations carried out by the unit 1 are commanded and controlled by an electronic system or microprocessor 35, which is connected electrically, by means of respective electric lines 36, 37, to the converter 15 and to the engine 2. The speed output by the unit 1 is selected by an operator, by means of a control lever 38. In other words, the operator selects the speed of the motor vehicle, by selecting an angle aa of inclination of the lever 38. In particular, the lever 38 can also be connected to a pedal.

As will be explained in greater detail hereinafter, in general, in the condition when power is obtained only from the engine 2, and when the machine 13 is functioning as a motor, the machine 20 acts as a generator, and vice versa. In order to determine which one of the machines 13, 20 must act as a motor, and which one must act as a generator, the microprocessor system 35 acts in an appropriate manner on the converter 15. In the over-boosting situation only, both the electric machines 13, 20 act as motors, or the electric machine 13 acts as a motor, whereas the other electric machine 20 does not absorb power (as described hereinafter).

The gearing 7 and the toothed wheels 12, 14, 17, 18, 22, 23, 25 constitute a device 39 for subdivision/re-combination (also known as splitter/combiner) of the powers distributed/absorbed by the engine 2 and by the machines 13, 20. Thus, firstly, the flow of mechanical power is divided into two flows. One flow of power is converted from mechanical to electrical. This flow of electrical power can easily be handled by controlling the factors of torque and the number of revolutions. It will be appreciated that for the same power, if the torque is increased, the number of revolutions decreases simultaneously, and vice versa, such as to keep the product of these factors constant. One of the advantages of the present invention is that when one flow of power is controlled, the other flow of power is also affected automatically. The torques which are provided in the flow of mechanical power and in the flow of electrical power are interconnected with one another. In fact, if the torque factor of one flow is decreased, the torque of the other flow is also changed. In all cases, the sum of the two torques is constant, and is the actual value of the torque which must be applied to the wheels in order to move the vehicle.

In other words, if P1 indicates the power which is first of all transformed into electrical power, and is then re-converted into mechanical power, and if P2 indicates the power which always continues to be mechanical, the sum of P1 and P2 must remain constant. Thus, if the power P1 is controlled, it is as if the power P2 were also being controlled. In other words, by means of the electrical regulation of the power P1, it is also possible to regulate the power P2, which has remained mechanical.

The functioning of the unit 1 which is the subject of the invention will be described hereinafter:

State 1 (Motor Vehicle Stopped—Engine Switched On—aa=0)

In this first state, the motor vehicle does not move, and thus its speed V is zero, and the brake 26 is on. The shaft 3 of the internal combustion engine 2 rotates, driving the spider 6 integrally with the shaft 4. The ring gear 10 is fixed, because it is braked by the brake 26, whereas the solar gear unit 9 is rotated by the action exerted on it by the spider 6. The consequence of rotation of the solar unit 9 is that the toothed wheels 12 and 14 also rotate, such that the machine 13 acts as a generator, if it is wished to charge the accumulation device 33 with electrical energy, or it simply rotates idly, when there is no need to charge the device 33. It will be appreciated that in the latter case, the electric machine 13 functions idly, since the machine 20 does not require power, and is maintained in a braked situation by the brake 26.

In the case in question, the epi-cycloid gearing 7 assumes the specific configuration of such a gearing with a fixed ring gear, and the reaction torque on the ring gear 10 depends on the re-charging energy produced by the machine 13, and is balanced by the action exerted by the brake 26.

State 2 (the Motor Vehicle Begins to Move—aa>0)

By means of the lever 38, the operator selects a somewhat low speed (1–2 Km/h) of the motor vehicle. The microprocessor system 35 releases the brake 26. Since in order to start the motor vehicle, it is necessary to have a high level of torque with a low speed, in this starting phase the machine 20 is activated as a motor, until the required speed is reached.

In order to make the machine 20 function as a motor, the converter 15 makes the machine 13 function as a generator, in order to produce the electrical energy required by the machine 20. Since the brake 26 has been released, and the machine 13 functions as a brake (since it now is a generator), negative torque is created on the solar unit 9, and, passing through the satellites 11, negative torque is furthermore created on the ring gear 10. This negative torque is transmitted to the shaft 24, and thus to the differential 28, via the toothed wheels 17, 18. It will be appreciated that, the greater the braking torque which acts on the machine 13 which is functioning as a generator, the greater the negative torque and the mechanical power transmitted to the shaft 24 via the wheels 17, 18. The torque on the ring gear 10, the torque supplied by the electric machine 13, and the torque supplied by the engine 2, are in a constant ratio with one another, owing to the geometric configuration of the gearing device 7.

The total torque which acts on the shaft 24 is provided by the sum of the direct torque supplied by the machine 20 (acting as a motor), and the reaction torque produced on the ring gear 10 by the machine 13 which functions as a generator. This total torque increases until the vehicle reaches the speed value selected by means of the lever 38.

If the power produced by the engine 2 is not sufficient to reach the speed selected, owing to an excessively high traction demand, the system is assisted initially by the device 33, which supplies the missing part of the power, replacing the generator partially or completely. The assistance by the device 33 ends when the operating conditions of the internal combustion engine 2 are restored by the system 35 to values such as to enable the engine 2 to develop the mechanical power which can make the motor vehicle reach the required speed.

State 3 (After State 2—the Operator Increases the Speed of the Vehicle, But Keeps it Below 50% of the Maximum Speed—the Traction is Low—aa>>0)

The converter 15 reacts, making the speed of the machine 20 increase until the vehicle reaches a speed which takes into account the total power available and the required traction. The power which is necessary in order for the machine 20 to reach the required speed is supplied partially by the machine 13, which in this case acts as a generator, and partially by increased negative torque produced by the ring gear 10 of the gearing 7.

The speed of the engine 2 is increased by the system 35 until the power required by the drive is reached, but still following the minimum fuel consumption curves. In the transition of the engine 2 from the previous operating conditions to the new ones, the engine is assisted by the device 33, which supplies the missing energy.

State 4 (After State 3—the Same as State 3, But with Increasing Traction)

In order to maintain the speed of the motor vehicle, the engine 2 must further increase the power distributed, by means of an increase in the injection of fuel, as well as of the speed of rotation of the shaft 3, up to the maximum level permitted by the optimized control of the engine 2 itself. If there were a requirement for power which was greater than the maximum which can be distributed by the engine 2, the missing power would be supplied by the device 33, for limited periods of time.

State 5 (After State 3—the Operator Increases the Speed of the Vehicle, Keeping it Above 50% of the Maximum Speed—the Traction is Low—aa>>>0)

The converter 15 reacts by more and more slowing down the machine 13, until the direction of rotation is inverted.

The latter thus becomes a motor, since the direction of rotation and the torque are disparate, and therefore the direction of rotation of the wheel 14 is changed. In this case, the gearing 7 no longer acts as a power distributor, but becomes a power combiner, and can sum purely mechanical power obtained from the engine 2, with electrical power, converted into mechanical power, obtained from the machine 13. In this configuration, it is possible to obtain high speeds of the shaft 24, and thus also high power levels distributed by this shaft 24, even with low speed outputs by the engine 2. Thus, in the present case, the machine 13 functions as a motor, whereas the machine 20 functions as a generator, and both are controlled by the converter 15, by means of the microprocessor system 35. The total torque which is delivered to the differential 28 is the torque provided by subtracting the torque necessary in order to make the machine 20 rotate from the torque present at the ring gear 10.

State 6 (After State 5—Speeds Selected Higher Than 50% of the Maximum Speed—Increasing Traction—aa>>>0)

The speed of the engine 2 is increased, in order to increase the power transmitted to the differential 28. The converter 15 controls the conversion of the machine 20 from a generator to a motor, whereas the machine 13 becomes a generator once more, absorbing power from the engine 2. The speed of the engine 2 is increased, both in order to adapt to the increase in the requirement for power, and to compensate for the modified operating conditions of the machine 13. Thus, the torque on the shaft 24 is increased firstly by an increase in the positive torque produced by the machine 20 which has become a motor, and secondly by a possible increase in the negative torque on the ring gear 10, caused by an increase in the torque absorbed by the machine 13.

Consequently, if the torque absorbed by the electric machine 13 which is functioning as a generator is regulated, there follows an automatic control, by balance, of the torque which is distributed purely mechanically via the toothed wheels 17, 18. If it were necessary to provide greater torque at the output, it would be sufficient to increase the braking action on the electric machine 13. However, if the electric machine 13 is braked, power is produced, which can be used to activate the electric machine 20, which in these operating conditions is functioning as a motor. The power converter 15 determines how much torque and how many revolutions must be supplied by the electric machine 20 which is functioning as a motor.

If there is a requirement for an increase in the power transmitted to the ground, this increase may be due to an increase in speed for the same traction, or to an increase in traction for the same speed, or to a variation of both factors. If, for example, there is an increase in power request due to an increase in traction, the system must react by providing greater torque, and in order to provide greater torque, it is necessary to increase both the mechanical and the electrical torque. However, in order to provide greater mechanical torque, it is necessary to increase the torque provided via the toothed wheels 17, 18. However, to obtain this torque increase, a rise in torque is required of the electric machine 13 exerted on the ring gear 10, and/or the torque transmitted by the electric machine 20 to the shaft 24, by means of the toothed wheels 22, 23, which are engaged with one another.

Figure 3A:
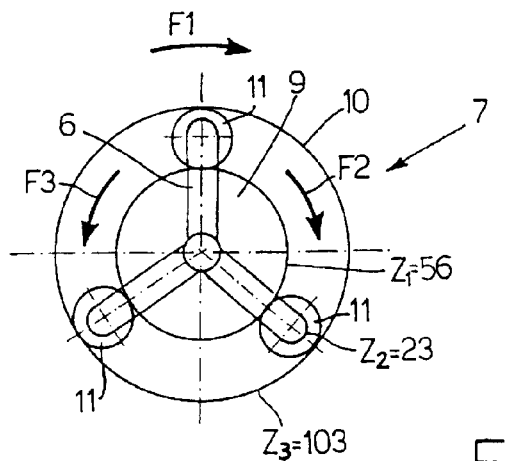
FIG. 3a is a schematic elevational view of a ring gear of an epi-cycloid drive used in the propulsion unit.
Figure 3B:
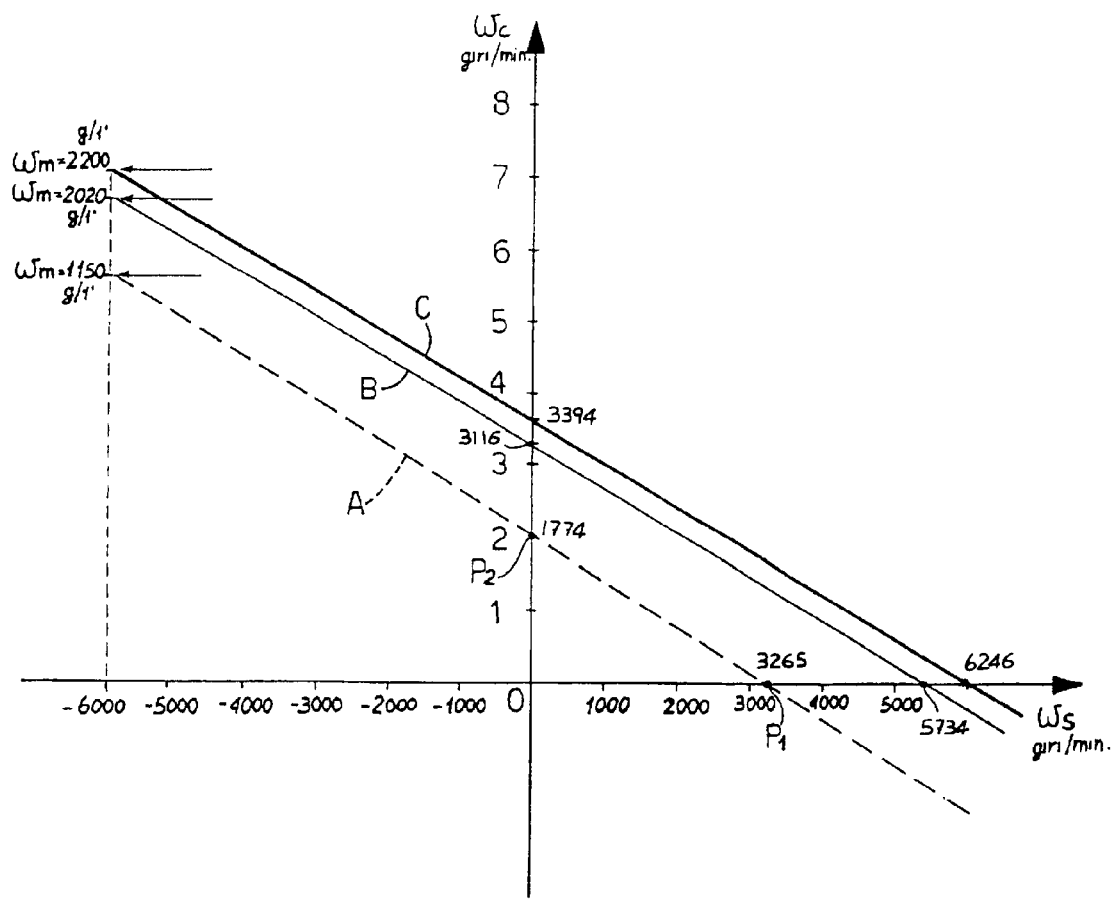
FIG. 3b is a graph illustrating the development of a set of straight lines which provide the speed of a ring gear of an epi-cycloid drive used in the present invention, according to the angular speeds of a corresponding solar gear; each straight line relates to a particular angular speed of the spider carrying the planet gears, and thus of a diesel engine connected to it, included in the propulsion unit of FIG. 2.

With reference in particular to FIGS. 3a, 3b, a gearing mechanism 7 (FIG. 3a) is proposed with the following characteristics:

$Z1=56$ (no. of teeth of the solar unit 9)      (1)

$Z2=23$ (no. of teeth of each satellite 11)      (2)

$Z3=103$ (no. of teeth of the ring gear 10)      (3)

By applying the well-known Willis formula, the following ratio between the angular speeds is obtained:

$$wws = 2{,}839\, wwm - 1{,}839\, wwc \quad (4)$$

wherein:

wws indicates the angular speed of the solar unit 9;

wwm indicates the angular speed of the engine 2, and thus of the spider 6; and wwc indicates the angular speed of the ring gear 10, which speed is proportional to that of the wheels of the motor vehicle.

For the purpose of our considerations, the following have been assumed:

| | |
|---|---|
| Mass of tractor: | 10350 kg |
| Maximum pull: | 7260 daN |
| Maximum power developed by diesel engine: | 125 kW |
| Maximum power available on ground: | 106 kW |

The ratio (4) which ties wws, wwm and wwc, is a linear ratio, which can be represented on a Cartesian plane as shown in FIG. 3b. For the purposes of demonstration, again as represented in FIG. 3b, it is possible to take into consideration three particular angular speeds of the engine 2, and thus also of the spider 6.

In the cases represented, the maximum speed (50 Km/h) of the motor vehicle is reached when the angular speed of the engine 2 equals the value of 2200 rpm. In addition, in the condition of maximum power distributed by the engine 2, the angular speed of the shaft 3 is 2020 rpm (line B), whereas in the condition of maximum angular speed of the shaft 3, the ratio which ties the angular speeds of the epi-cyclic drive is represented by the line C.

It is apparent that, starting from a stand-still position of the vehicle, the curve to be followed is that relative to the maximum torque development, for an angular speed of the engine 2 of 1150 rpm (line A in FIG. 3b). Let it be assumed that the starting point is P1 on line A, at which the angular speed of the solar unit wws is 3265 rpm. If there is a need to increase the torque output from the system, it is necessary to start to brake the electric machine 13, giving rise to negative torque on the latter, such that movement begins on the straight line A away from P1.

By means of the epi-cycloid gearing 7, torque is thus generated on the ring gear 10, which begins to move at an angular speed wwc, the ratio between wws and wwc being predetermined by the straight line A. The speed wws begins to decrease, as upwards movement along the straight line A takes place. When a speed wwc of the ring gear 10 of approximately 1774 rpm is reached (corresponding generally to a speed of 19 Km/h of the wheels) the solar unit 9 has an angular speed wws of zero (point P2 in FIG. 3b), i.e. the electric machine 13 does not function either as a generator or as a motor, but supplies torque at zero speed.

Up to a moment before it is stopped at point P2, the solar unit 9 rotates according to an arrow F2, in the same direction of rotation of the ring gear 10, which is marked by an arrow F1, as shown in FIG. 3a. If the speed required by the ring 10, and thus by the motor vehicle, is greater than 1774 rpm, it will be necessary to move to the negative quadrant of the graph shown in FIG. 3b, in which there are negative speeds wws.

Thus, the solar unit 9 will begin to rotate according to an arrow F3, i.e. in the direction opposite to that of the ring gear 10. As such, the gearing mechanism 7 becomes a speed multiplier for the ring gear 10, and thus for the wheels of the motor vehicle. Finally, the system will settle at a speed wwc, in this case 5037 rpm, which is equivalent to the speed selected by the operator by means of the lever 38.

Accordingly, by means of a negative speed of the solar unit 9 turning in the sense of arrow F3, it is possible to increase the speed of the ring gear 10, and therefore of the wheels. Consequently, the electric machine 13 is transformed from a machine which takes power from the engine 2, to a machine which provides power to the epi-cycloid gearing 7, such as to increase the speed of the ring gear 10, and ultimately that of the motor vehicle.

It will be appreciated that it is the system 35 which establishes the moment of conversion of the electric machine 13 from a generator to a motor. It is also apparent that the electrical power in order to make the electric machine 13 function as a motor, is supplied by the electric machine 20, which, at this time, functions as a generator, so that it rotates the pair of wheels 23, 22 engaged with one another. In this case, the system 35 must brake the electric machine 20.

As already stated, in most operating conditions which can be provided by the unit 1, the two electric machines 13 and 20 exchange roles, since when one becomes a generator, the other acts as a motor, and vice versa. Since there is power which is exchanged between the two machines 13 and 20, and does not reach the ground, this power is considered as apparent or non-existing and therefore a loss, in terms of power efficiency.

Figure 4:
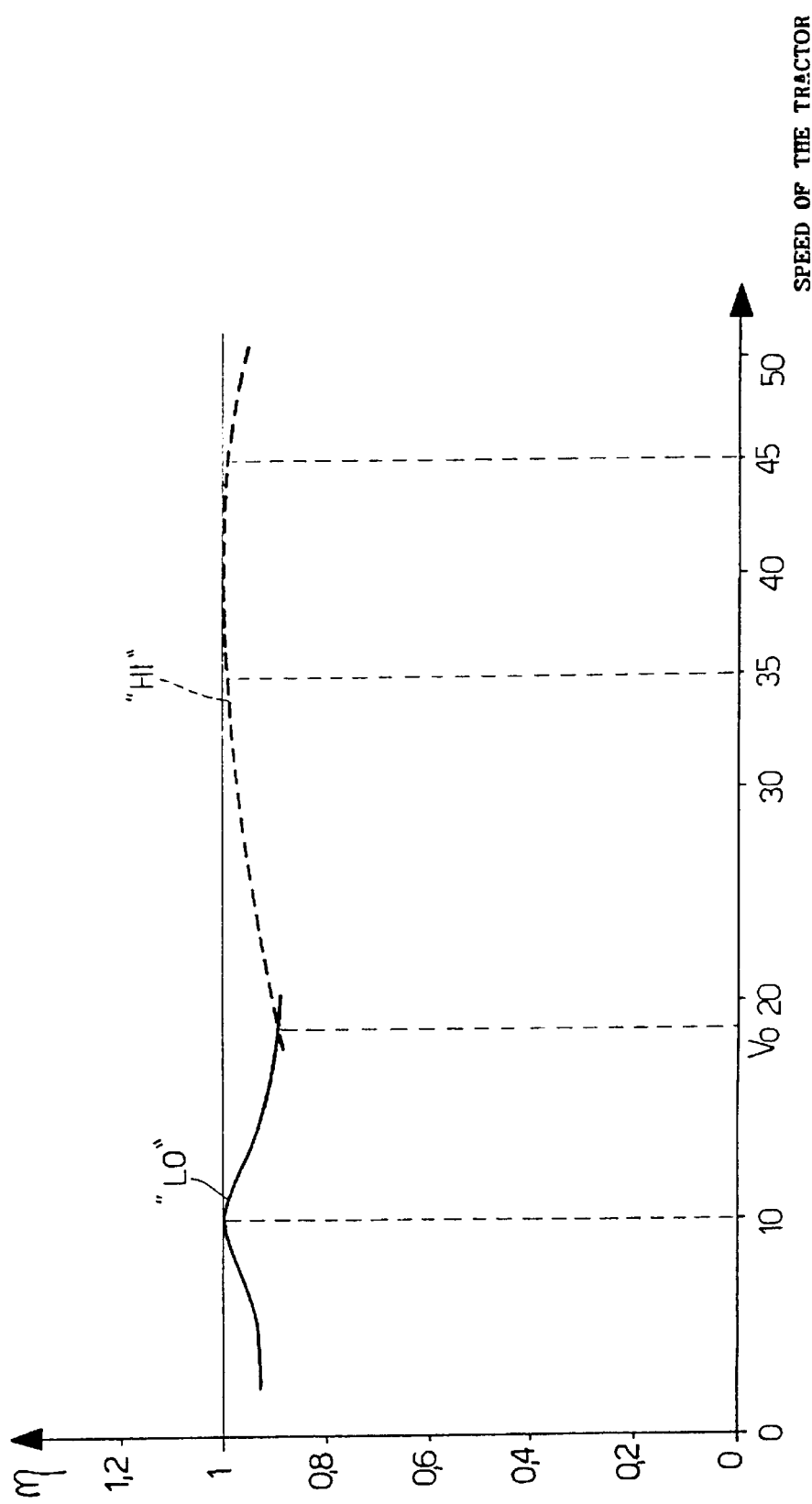
FIG. 4 is a graph showing the development of the corresponding efficiency, relative to an ideal mechanical transmission, according to the speed of a tractor incorporating the propulsion unit.

In order to keep the efficiency levels high, it is necessary to limit this apparent power, which increases as the speed of the machines 13, 20 increases. Thus, in order to increase the speed of the motor vehicle, without increasing the speed of the electric machines 13, 20 excessively, the gear change mechanism 27 with two ratios is advantageously applied, making it possible to change from a low transmission ratio (the "LO" state), to a high transmission ratio (the "HI" state), as shown in FIG. 4. In other words, there is a maximum speed wwc of the ring gear 10, and thus a value Vo of the motor vehicle (FIG. 4), beyond which it is not appropriate to go, since beyond that value, the relative efficiency hh in relation to a purely mechanical ideal efficiency would drop drastically, because the power transmitted between the two electric machines 13, 20 would increase too much.

FIG. 4 also shows the fact that maximum h occurs at a speed of the tractor of approximately 10 km/h and at a range of speeds from 35 km/h to 45 km/h (see below). With reference once more to the epi-cycloid gearing 7 shown in particular in FIGS. 2 and 3a, in order for the motor vehicle to move in reverse, for a given speed of the engine 2, and thus of the spider 6, the angular speed wws of the solar unit 9 must be high enough to make the angular speed of the ring gear 10 negative. FIG. 3b shows that, if, whilst still on the line A, an angular speed wws greater than 3265 rpm is imparted to the solar unit, the angular speed wwc of the ring gear 10 becomes negative, i.e. the motor vehicle goes into reverse. In this case, the electric machine 13 must provide a greater number of revolutions by functioning as a generator, and the machine 20 continues to be a motor, with the direction of rotation inverted.

If the PTO (not shown) is applied by engaging the clutch 8, it is required to step over from the line A to the lines B and C shown in FIG. 3b. In fact, in order to make the PTO function appropriately, a somewhat higher number of revolutions, pre-determined by the shaft 4, must be available. Thus, for the same angular speed wwc of the ring gear 10, and therefore for the same speed of the motor vehicle, there are higher speeds of the solar unit 9, and thus the electric machine 13 rotates at a higher angular speed when it is functioning as a generator (right-hand quadrant in FIG. 3b), and at a lower speed when it is functioning as a motor (left-hand quadrant in FIG. 3b).

Therefore, with the PTO applied, the considerations concerning different operating conditions which can be assumed by the unit 1, will be associated with the development of the lines B and C in FIG. 3b. It is also apparent that, in the event of malfunctioning of the engine 2, or in the case when the motor vehicle must operate in a closed environment, for example in a greenhouse, it can be ensured that the unit 1 functions as a pure electric unit, in which the electric machines 13, 20, both acting as motors, obtain electrical energy from the device 33.

In addition, as shown in FIG. 2, the system 35 is connected to the device 5 by means of the electric line 40. When this device 5 is disconnected, and only the electric machines 13, 20 function, it is possible to activate the PTO electrically, with all the corresponding advantages which this fact involves, in particular concerning pollution of the environment in which the motor vehicle is operating.

The advantages of the unit which is the subject of the present invention are as follows:
fine, continuous regulation of the power which is transferred from the internal combustion engine to the wheels of the motor vehicle;

the predominant fraction of the power transferred continues to be mechanical, such that there is a reduction of losses caused by the double conversion of mechanical to electrical, and electrical to mechanical energy;

total efficiency levels which are comparable with those of a purely mechanical drive, and which can be optimized for the characteristic speeds prevalently used;

in the case of a large requirement for power by the motor vehicle, there is the so-called over-boost, and it is possible for the power used to be distributed simultaneously by the internal combustion engine, and by at least one electric machine which is functioning as a motor; and finally there is the possibility of making the unit function only by means of the electrical energy which is stored in the batteries, both concerning the movement of the motor vehicle and the PTO; in this case, electrical energy alone is used to move the propulsion unit, and/or to rotate the PTO.

Another advantage of the present invention is illustrated with reference to FIG. 5, in which the x-axis represents the ground speed of the tractor (in km/h), while the y-axis represents the power delivered to the ground in kW. In particular, C1 is the curve of total ground power (both mechanical and electrical) while C2 indicates the curve of the electrical power generated by the electrical machines 13, 20.

Curve C1 visualizes the fact that the tractor's ground power, up to a tractor speed of 7 km/h, increases in linear fashion, because it is first necessary to overcome the adhesion of the wheels to the ground, and then stabilizes at a value of around 106 kW. The difference between the initial 125 kW produced by the diesel engine 2 and the ground power of 106 kW is of course due to the losses inherent in the system, and to the fact that the efficiency is of course different from value 1. Examination of FIG. 5 will show also that the maximum electrical power represented by a first part of curve C2 has a value of 12 kW for a tractor speed again of around 7 km/h.

Therefore, with an electrical power whose value is about one eighth of the total power, the system can be controlled in the way described above. It has been verified experimentally that, in the case under examination, if this ratio between the electrical power and total power is kept lower than the value mentioned above (one eighth) the system is liable to become ungovernable (in other words, the electrical power is not sufficient to regulate the mechanical power), while if a higher value is selected there is a loss of efficiency, because, as we have seen, an increase in electrical power corresponds to a drop in total efficiency. As a consequence of this, the value selected for the ratio between the two powers (electrical power and total power) represent the best compromise between the above mentioned two requirements.

The above considerations refer to the limit conditions of maximum power (FIG. 5); for lower delivered powers the ranges R1 and R2 (discussed furtheron) may be greater. In order to improve the total efficiency of the system it is very important that, in certain ranges of speed of the tractor, the electrical power (curve C2) generated by the electrical machines 13 and 20 should be zero. In other words only the diesel engine 2 is supplying power. For the same delivered power (curve C1), the diesel engine 2 increases the number of revolutions of the shaft 3 and so increases the ground speed without involving the electrical machines 13, 20.

For the system to work at its best, the ranges of ground speeds at which no electrical power is being used should be those in which the tractor is most often working. In particular, referring to FIG. 5, this shows a first range R1 containing only the one value 10 km/h, corresponding to the speed of working on the field using tools, and a second range R2 stretching from 35 km/h to 45 km/h, corresponding to the tractor travelling on the road. As FIG. 5 further shows, in both ranges R1, R2, electrical power represented by the curve C2 is zero. The only power produced and transmitted to the ground is that of the diesel engine 2, which, beginning at a maximum torque when the ground speed is 35 km/h, increases the number of revolutions without changing the amount of power transmitted to the ground (curve C1)—while the value of the torque simultaneously declines—up to a ground speed of 45 km/h (range R2). In particular, as it moves through range R2, the rotor of the electrical machine 13 is stationary. This of course depends on how the diesel engine 2 is controlled by the central control unit 35.

Figure 5:
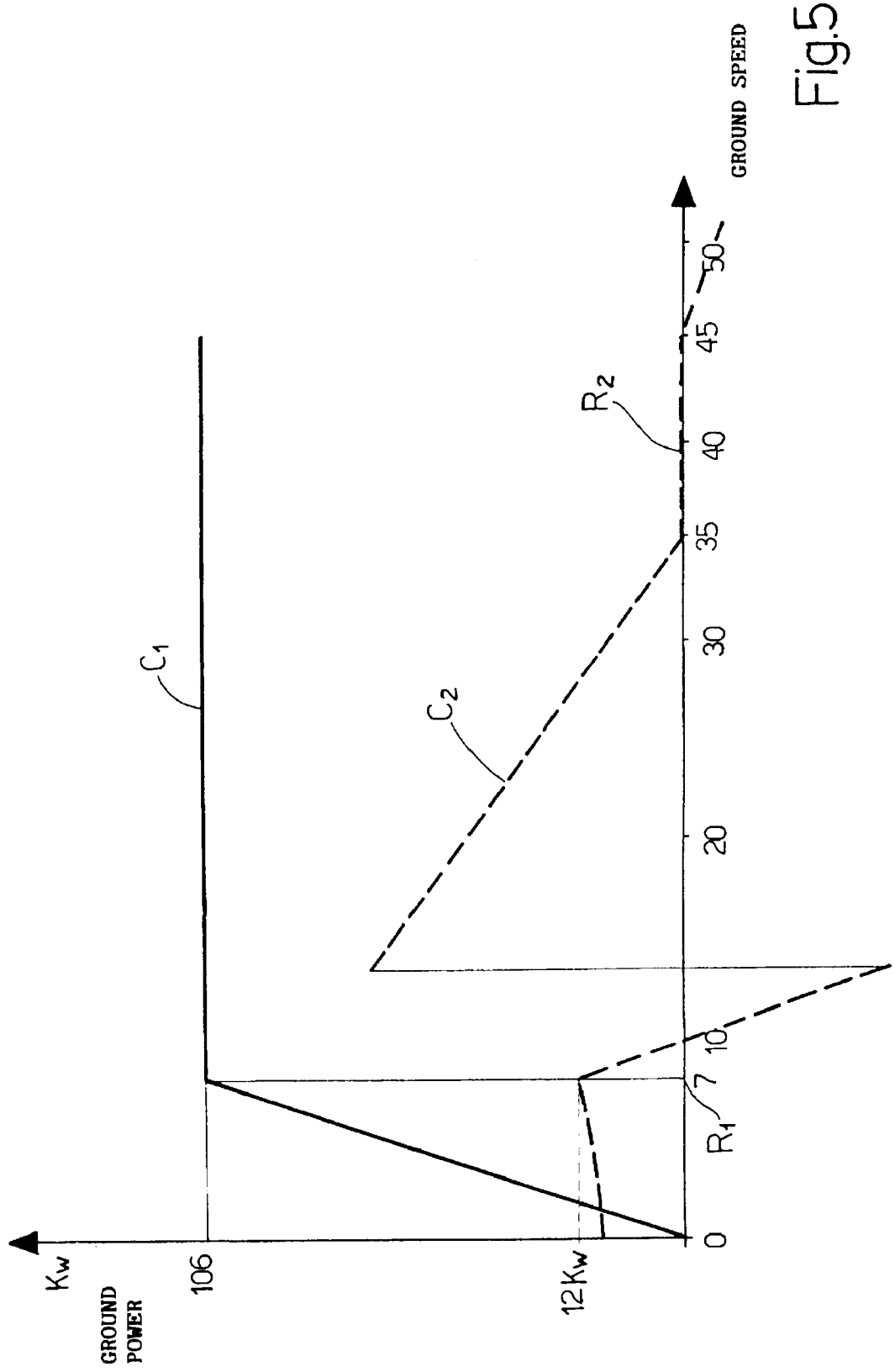
FIG. 5 is a graph illustrating the power delivered to the ground as a function of the velocity of the tractor, also measured relative to the ground.

In FIG. 5, negative values of the electrical power represented by curve C2 are explained by the fact that, at certain ground speeds, the electrical power is absorbed by at least one electrical motor 13, 20. The results given above were obtained experimentally precisely because of the particular choice of the number of teeth Z1, Z2, Z3 on the respective gearwheels 9, 11, 10 (see equations (1), (2), (3)) present in the epi-cyclic gearing 7. As stated, the number of teeth was chosen on the basis of the characteristics of the tractor. For these figures, as already stated earlier, the highest possible values of h are used (the value of h approaching one) (FIG. 4), because of the reduction of electrical power to zero and maximization of mechanical power.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a propulsion unit for a tractor movable at selectable ground speeds, said propulsion unit including a diesel engine and at least two electrical machines, each of said diesel engine and said electrical machines having an output power, said electrical machines being operable to deliver and to absorb output power, said diesel engine and said at least two electrical machines being connected mechanically to a device operable to subdivide and to re-combine of the output powers delivered by said diesel engine and of said electrical machines, said electrical machines being capable of operating both as generators and as motors, the improvement comprising:

the propulsion unit is configured such that in at least one interval of the ground speed of the tractor, the electrical fraction of the power delivered and absorbed by the said electrical machines is zero; and said device for subdividing and re-combining the output powers comprises epi-cyloid gearing comprising:
a spider connected mechanically to the said diesel engine;
a solar unit connected mechanically to one of said electric machines; and
a ring gear connected mechanically to a vehicle drive train, and to the other of said electric machines.

2. The propulsion unit of claim 1 wherein said solar unit includes a sun gear having nine teeth and a plurality of planet gears engaged with said sun gear, each said planet gear having 11 teeth, said ring gear being engaged with said planet gears, such that said planet gears are operably engaged with both said sun gear and said ring gear, said ring gear having 10 teeth.

3. The propulsion unit of claim 1 wherein the electrical fraction of the power delivered or absorbed by the said electrical machines is zero in a first interval corresponding to a ground speed of the tractor of approximately 10 km/h.

4. The propulsion unit of claim 1 wherein the electrical fraction of the power delivered or absorbed by the said electrical machines is zero in a second interval corresponding to a ground speed of the tractor between approximately 35 km/h and 45 km/h.

5. The propulsion unit of claim 1 wherein said spider is connected mechanically to a power-takeoff apparatus of said tractor.

6. The propulsion unit of claim 1 wherein the operation of the said electrical machines is controlled by a power converted which is controlled by an electronic system, said electronic system also controlling the injection of fuel into the said engine and controlling whether or not switching on takes place of a torque limiting device, and for mechanical connection between an output shaft of said diesel engine and a transmission shaft operatively connected to said device for subdividing and re-combining the output powers.

7. The propulsion unit of claim 6 wherein said electric machines, said electronic system, and said torque limiting device can actuate the said power-takeoff and/or move said vehicle in a purely electrical manner.

8. The propulsion unit of claim 7 further including a gear change mechanism provided with two ratios, enabling to change from a low transmission ratio, to a high transmission ratio, in order to keep the efficiency levels of the propulsion unit high.

9. The propulsion unit of claim 1 further comprising energy storage apparatus which is loaded by at least one of the electrical machines during normal operation of the propulsion unit, the energy storage apparatus being operable to deliver energy to at least one of the electrical machines when acting as a motor to over-boost the propulsion unit with supplemental power over and above the power normally provided by said diesel engine.

10. In a propulsion unit for a tractor movable at selectable ground speeds, said propulsion unit including a diesel engine and at least two electrical machines, each of said diesel engine and said electrical machines having an output power, said electrical machines being operable to deliver and to absorb output power, said diesel engine and said at least two electrical machines being connected mechanically to a device operable to subdivide and to re-combine of the output powers delivered by said diesel engine and of said electrical machines, said electrical machines being capable of operating both as generators and as motors, the improvement comprising:

- the propulsion unit is configured such that in at least one interval of the ground speed of the tractor, the electrical fraction of the power delivered and absorbed by the said electrical machines is zero;
- said device for subdividing and re-combining the output powers comprises epi-cyloid gearing; and
- the electrical fraction of the power delivered or absorbed by the said electrical machines is zero in a first interval corresponding to a ground speed of the tractor of approximately 10 km/h.

11. In a propulsion unit for a tractor movable at selectable ground speeds, said propulsion unit including a diesel engine and at least two electrical machines, each of said diesel engine and said electrical machines having an output power, said electrical machines being operable to deliver and to absorb output power, said diesel engine and said at least two electrical machines being connected mechanically to a device operable to subdivide and to re-combine of the output powers delivered by said diesel engine and of said electrical machines, said electrical machines being capable of operating both as generators and as motors, the improvement comprising:

- the propulsion unit is configured such that in at least one interval of the ground speed of the tractor, the electrical fraction of the power delivered and absorbed by the said electrical machines is zero;
- said device for subdividing and re-combining the output powers comprises epi-cyloid gearing; and
- the electrical fraction of the power delivered or absorbed by the said electrical machines is zero in a second interval corresponding to a ground speed of the tractor between approximately 35 km/h and 45 km/h.

* * * * *